(12) United States Patent
Brochard et al.

(10) Patent No.: US 9,868,545 B2
(45) Date of Patent: Jan. 16, 2018

(54) PRIMARY STRUCTURE FOR AN ATTACHMENT PYLON WITH FIREWALL AND THERMAL LAYERS

(71) Applicant: Airbus Operations (S.A.S.), Toulouse (FR)

(72) Inventors: Wolfgang Brochard, Toulouse (FR); Sébastien Alby, Tournefeuille (FR); David Ewens, Merville (FR)

(73) Assignee: Airbus Operations (S.A.S.), Toulouse (FR)

( * ) Notice: Subject to any disclaimer, the term of this patent is extended or adjusted under 35 U.S.C. 154(b) by 28 days.

(21) Appl. No.: 14/573,447

(22) Filed: Dec. 17, 2014

(65) Prior Publication Data

US 2015/0175272 A1 Jun. 25, 2015

(30) Foreign Application Priority Data

Dec. 19, 2013 (FR) ...................... 13 63046

(51) Int. Cl.
 *B64D 45/00* (2006.01)
 *B64D 27/26* (2006.01)
 (Continued)

(52) U.S. Cl.
 CPC ................ *B64D 45/00* (2013.01); *A62C 3/08* (2013.01); *B64D 27/26* (2013.01); *F02C 7/20* (2013.01);
 (Continued)

(58) Field of Classification Search
 CPC .............. B64D 27/26; B64D 2027/262; B64D 2027/264; B64D 2045/009; B64D 29/04;
 (Continued)

(56) References Cited

U.S. PATENT DOCUMENTS 3,222,017 A 12/1965 Bobo
3,357,657 A * 12/1967 Ferrel .................... B64D 45/00
 244/54
(Continued)

FOREIGN PATENT DOCUMENTS

CA 2801366 A1 12/2011
CA 2839336 A1 12/2012
(Continued)

OTHER PUBLICATIONS

French Search Report for Application No. FR 1363046 dated Aug. 6, 2014.
(Continued)

*Primary Examiner* — Tien Q Dinh
*Assistant Examiner* — Alexander V. Giczy
(74) *Attorney, Agent, or Firm* — Jenkins, Wilson, Taylor & Hunt, P.A.

(57) ABSTRACT

A protective assembly and structural element for an aircraft comprising a portion of an attachment pylon primary structure is provided. The attachment pylon primary structure portion is at least partially covered by a protective assembly comprising a layer forming a firewall and a thermally insulating layer, the thermally insulating layer being located between the layer forming a firewall and the attachment pylon primary structure portion. The protective assembly is attached to the pylon primary structure by fasteners axially arranged in pairs, one of each pair extending through the protective assembly and the other of each pair extending through the pylon primary structure.

12 Claims, 2 Drawing Sheets

(51) Int. Cl.
  *A62C 3/08* (2006.01)
  *F02C 7/25* (2006.01)
  *F02C 7/20* (2006.01)
  *A62C 2/06* (2006.01)

(52) U.S. Cl.
  CPC ............... *F02C 7/25* (2013.01); *A62C 2/065* (2013.01); *B64D 2045/009* (2013.01); *F05D 2300/702* (2013.01); *Y02T 50/672* (2013.01)

(58) Field of Classification Search
  CPC ........... B64D 45/00; A62C 3/08; A62C 2/065; A62C 2/06; E04B 1/94; E04B 2/7411; E04B 9/08; E04B 1/76; E04B 1/7604; E04B 1/7608; E04B 1/78; F02C 7/25; F02C 7/20; E04C 2/292; E04C 2/284; E04D 13/1625
  See application file for complete search history.

(56) References Cited

U.S. PATENT DOCUMENTS

| | | | | |
|---|---|---|---|---|
| 3,779,006 | A * | 12/1973 | Lewis | E04B 1/941 244/54 |
| 3,818,469 | A * | 6/1974 | Lindberg | A62C 99/009 200/83 R |
| 4,044,973 | A | 8/1977 | Moorehead | |
| 4,767,656 | A * | 8/1988 | Chee | B32B 3/12 156/307.4 |
| 4,801,496 | A | 1/1989 | Buchacher | |
| 4,821,980 | A | 4/1989 | Clausen | |
| 5,065,959 | A | 11/1991 | Bhatia | |
| 5,443,229 | A | 8/1995 | O'Brien | |
| 5,524,846 | A * | 6/1996 | Shine | B64D 27/00 244/121 |
| 5,860,276 | A * | 1/1999 | Newton | F02C 7/20 60/226.1 |
| 5,910,094 | A * | 6/1999 | Kraft | B64D 29/00 277/419 |
| 7,448,573 | B2 | 11/2008 | Lafont | |
| 7,607,609 | B2 | 10/2009 | Levert | |
| 7,677,044 | B2 * | 3/2010 | Barbeln | F23R 3/007 277/641 |
| 7,950,604 | B2 | 5/2011 | Combes | |
| 8,222,165 | B2 * | 7/2012 | Olver | B32B 5/26 156/60 |
| 8,226,029 | B2 | 7/2012 | Haramburu | |
| 8,251,311 | B2 | 8/2012 | Combes | |
| 8,336,812 | B2 | 12/2012 | Beaufort | |
| 8,413,925 | B2 | 4/2013 | Martinou | |
| 8,789,790 | B2 | 7/2014 | Marche | |
| 8,864,066 | B2 | 10/2014 | Marche | |
| 9,067,688 | B2 | 6/2015 | Bellabal et al. | |
| 2003/0014963 | A1 * | 1/2003 | Aramburu | A62C 3/08 60/39.091 |
| 2003/0178525 | A1 * | 9/2003 | Ramer | A63H 27/06 244/3.1 |
| 2003/0201366 | A1 * | 10/2003 | Connelly | B64D 33/04 244/121 |
| 2003/0213871 | A1 * | 11/2003 | Howe | B64D 37/00 244/129.1 |
| 2004/0194975 | A1 * | 10/2004 | Trumper | B64D 25/00 169/35 |
| 2005/0151017 | A1 * | 7/2005 | Noiseux | A62C 2/14 244/129.2 |
| 2005/0178887 | A1 | 8/2005 | Beutin | |
| 2005/0274485 | A1 | 12/2005 | Huggins | |
| 2006/0038066 | A1 | 2/2006 | Udall | |
| 2007/0246603 | A1 | 10/2007 | Udall | |
| 2008/0105782 | A1 | 5/2008 | Beardsley | |
| 2008/0272229 | A1 | 11/2008 | Lafont et al. | |
| 2009/0090811 | A1 | 4/2009 | Llamas Sandin | |
| 2009/0212155 | A1 | 8/2009 | Huggins | |
| 2009/0308022 | A1 * | 12/2009 | Kiskiras | B64C 1/40 52/794.1 |
| 2011/0121132 | A1 | 5/2011 | Crook | |
| 2011/0284686 | A1 * | 11/2011 | Caruel | B64D 27/26 244/54 |
| 2012/0080555 | A1 * | 4/2012 | Lafont | B64D 27/26 244/54 |
| 2012/0082808 | A1 * | 4/2012 | Lemains | F02C 7/24 428/34.1 |
| 2012/0104162 | A1 * | 5/2012 | West | B64C 1/1453 244/54 |
| 2012/0227370 | A1 * | 9/2012 | Mickelsen | A62C 3/08 60/39.11 |
| 2013/0105622 | A1 * | 5/2013 | Journade | B64D 29/02 244/54 |
| 2013/0187004 | A1 * | 7/2013 | Caballero | B64D 45/02 244/129.2 |
| 2013/0232768 | A1 | 9/2013 | Suciu | |
| 2014/0064950 | A1 | 3/2014 | Brochard | |
| 2014/0102114 | A1 * | 4/2014 | Demoulin | F02C 7/20 60/797 |
| 2014/0130512 | A1 | 5/2014 | Chouard et al. | |
| 2014/0322479 | A1 * | 10/2014 | Plaindoux | F02C 7/25 428/99 |
| 2015/0048202 | A1 * | 2/2015 | Takeuchi | F02C 7/25 244/54 |
| 2015/0166192 | A1 | 6/2015 | Ewens et al. | |
| 2015/0197341 | A1 | 7/2015 | Ewens et al. | |
| 2015/0259074 | A1 | 9/2015 | Guillemaut et al. | |

FOREIGN PATENT DOCUMENTS

| | | | | |
|---|---|---|---|---|
| DE | 29622647 | U1 | 5/1997 | |
| EP | 2332834 | A2 | 6/2011 | |
| EP | 2436601 | A1 | 4/2012 | |
| EP | 2631180 | A1 | 8/2013 | |
| FR | 2127472 | A6 | 10/1972 | |
| FR | 2891243 | A1 | 3/2007 | |
| FR | 2891252 | A1 | 3/2007 | |
| FR | 2915175 | A1 | 10/2008 | |
| FR | 2917712 | A1 | 12/2008 | |
| FR | 2935953 | A1 | 3/2010 | |
| FR | 2942165 | | 8/2010 | |
| FR | 2946621 | A1 | 12/2010 | |
| FR | 2950322 | A1 | 3/2011 | |
| FR | 2970700 | A1 | 7/2012 | |
| FR | 2976914 | A1 | 12/2012 | |
| FR | 2979829 | A1 * | 3/2013 | ............... F02C 7/25 |
| FR | 2994941 | A1 | 3/2014 | |
| FR | 2996823 | A1 * | 4/2014 | ............... F02C 7/20 |
| WO | WO-2009/040864 | A1 | 4/2009 | |
| WO | WO-2010/066985 | A1 | 6/2010 | |

OTHER PUBLICATIONS

French Search Report for Application No. FR 1363451 dated Aug. 18, 2014.
French Search Report for Application No. FR 1362781 dated Aug. 19, 2014.
French Search Report for Application No. FR 1362777 dated Aug. 19, 2014.
Final Office for U.S. Appl. No. 14/133,023 dated Aug. 18, 2016.
Non-Final Office Action for U.S. Appl. No. 14/575,332 dated Sep. 7, 2016.
Restriction Requirement for U.S. Appl. No. 14/571,772 dated Apr. 15, 2016.
Non-Final Office Action for U.S. Appl. No. 14/571,786 dated Jun. 3, 2016.
Restriction Requirement for U.S. Appl. No. 14/557,074 dated Jul. 1, 2016.
Non-Final Office Action for U.S. Appl. No. 14/571,772 dated Jul. 21, 2016.
Final Office Action for U.S. Appl. No. 14/571,786 dated Jan. 12, 2017.
Final Office Action for U.S. Appl. No. 14/571,772 dated Jan. 26, 2017.
Final Office Action for U.S. Appl. No. 14/571,786 dated Apr. 21, 2017.

(56) References Cited

OTHER PUBLICATIONS

Notice of Allowance and Applicant Initiated Interview Summary for U.S. Appl. No. 14/571,772 dated May 12, 2017.
Non-Final Office Action for U.S. Appl. No. 14/575,332 dated Jun. 7, 2017.

* cited by examiner

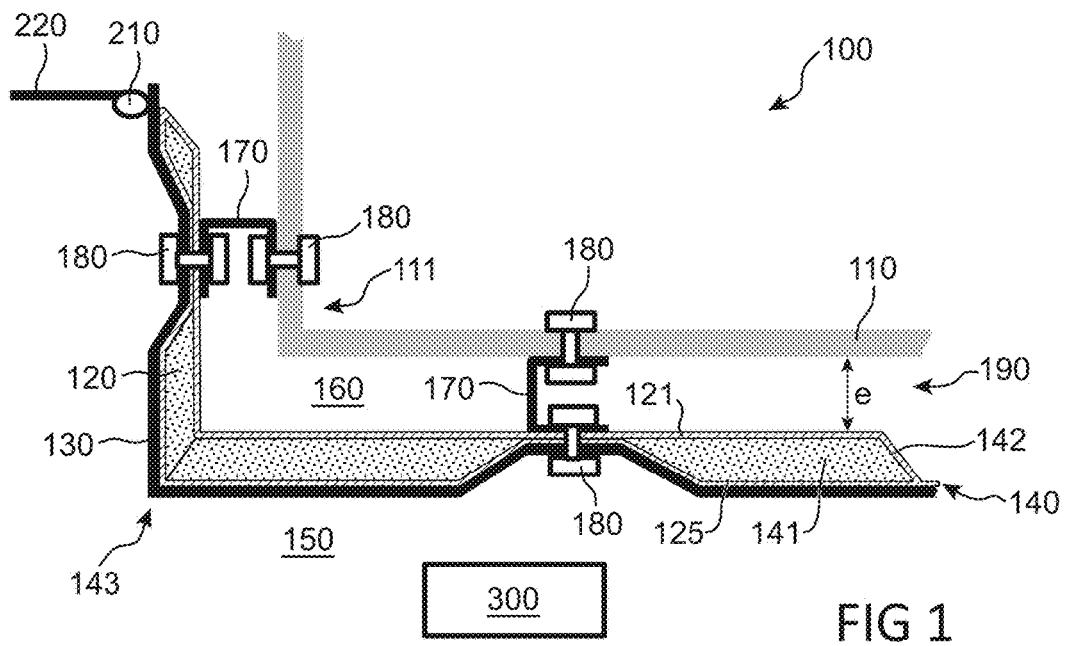
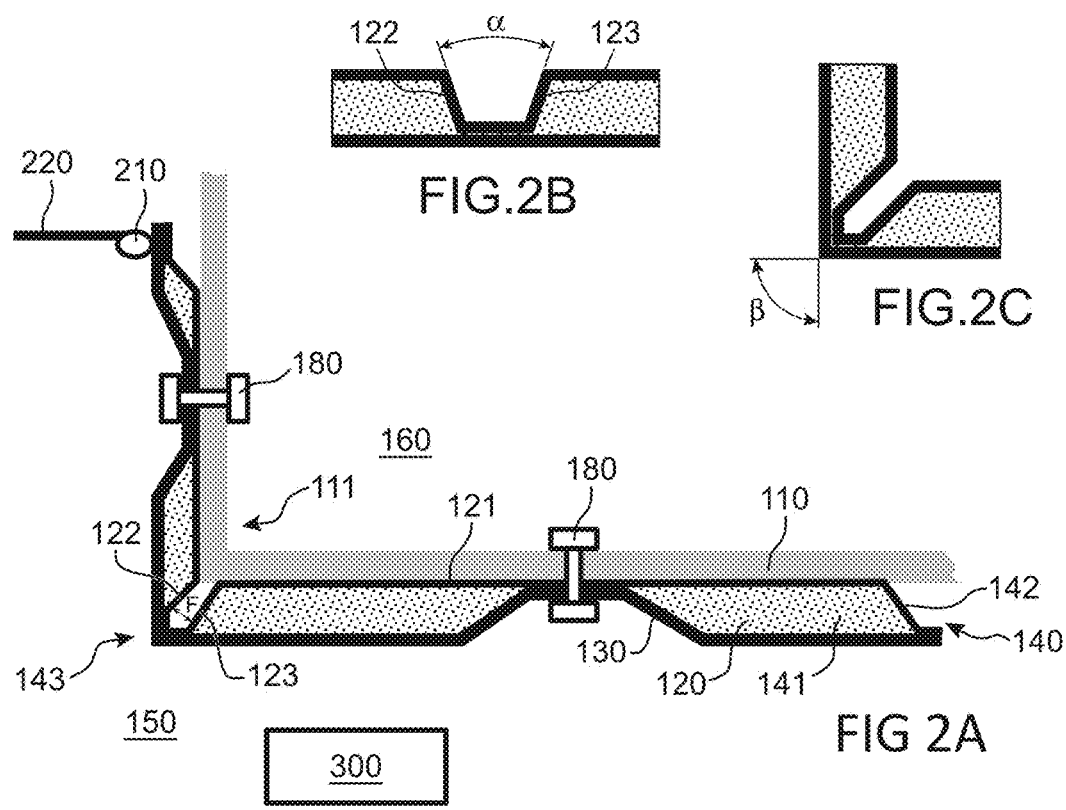

PRIMARY STRUCTURE FOR AN ATTACHMENT PYLON WITH FIREWALL AND THERMAL LAYERS

CROSS-REFERENCE TO RELATED APPLICATION

This application claims the benefit of and priority to French Patent Application No. 13 63046 filed on Dec. 19, 2013, the entire disclosure of which is incorporated by reference herein.

TECHNICAL FIELD

The present disclosure relates to the field of primary structures for attachment pylons on aircraft.

BACKGROUND

The attachment pylon designates an attachment device by which it is possible to connect an aircraft engine to the rest of the aircraft. The attachment pylon forms a connection between an engine, in particular a turbofan or a CROR (Counter-Rotating Open Rotor), and an element of the aircraft such as the wing, the fuselage, or the empennage.

The attachment pylon makes it possible to transmit to the structure of the aircraft the forces generated by the engine. It is sometimes designated by the acronym EMS, for "Engine Mounting Structure".

The attachment pylon comprises:
- a secondary structure comprising fairings, serving in particular to provide the pylon with an aerodynamic shape; and
- a rigid structure, termed the primary structure, connected directly to the engine and designed to transmit forces from the engine to the rest of the aircraft.

An object of the present disclosure is to provide structure for securing the connection between an engine of an aircraft and the rest of the aircraft, for example a connection between an engine of an aircraft and the wing of the latter.

SUMMARY

This object is achieved with an attachment pylon primary structure portion which is at least partially covered by a protective assembly comprising a layer forming a firewall and a thermally insulating layer, thermally insulating layer being located between the layer forming a firewall and the attachment pylon primary structure portion.

Advantageously, the protective assembly is positioned on the side of a primary structure portion facing an engine of the aircraft.

Thermally insulating layer then forms a thermal barrier between the primary structure and the engine. Thus, during normal operation of the engine, the primary structure portion covered by thermally insulating layer is kept at a substantially constant temperature. In the event of an engine fire, thermally insulating layer slows the temperature rise of the primary structure portion. Due to thermal conductivity of the primary structure, this in fact protects the entire primary structure from high temperature gradients.

Thus, whatever the state of the engine, the primary structure is kept at the lowest possible temperature. This improves the strength of the primary structure by limiting temperature rises, thus reducing the risk of failure.

The layer forming a firewall protects the primary structure from fire. The layer forming a firewall is arranged above thermally insulating layer. It thus also protects thermally insulating layer from direct contact with the fire. Thus, even if thermally insulating layer is fire-sensitive, it continues to act as a thermal barrier between the primary structure and an engine fire.

This thus produces a structural element for an aircraft in which a primary structure portion has excellent mechanical strength over time, in particular in the event of an engine malfunction such as an engine fire caused by hydraulic fluid and/or fuel. The disclosure herein thus makes it possible to secure the connection between an engine and another element of the aircraft, for example its wing, in particular in the event of an engine fire.

The disclosure herein also makes it possible to use a wide variety of materials for the primary structure, while adhering to current legislation governing resistance to fire in the event of an engine fire (fireproof structure, European Aviation Safety Agency Certification Specification CS-25). The legislation relating to an aeronautical environment requires 15 minutes of fire resistance, but it is to be noted that it is possible to increase this duration, by increasing the thickness of the layer forming a firewall and/or thermally insulating layer.

The attachment pylon primary structure portion is advantageously made of composite material.

The layer forming a firewall may be metallic.

As a variant, the layer forming a firewall may be made of composite material.

The thickness of the layer forming a firewall is advantageously determined as a function of a desired fire resistance duration.

The thickness of thermally insulating layer is advantageously determined as a function of a desired fire resistance duration.

Thermally insulating layer may comprise a thermally insulating material.

According to a first advantageous embodiment, thermally insulating material is encased within an envelope.

The layer forming a firewall and the envelope may be attached to one another by an intumescent adhesive or an intermediate intumescent adhesive layer.

As a variant, the envelope may comprise the layer forming a firewall, produced by an increased thickness of the envelope.

According to a second advantageous embodiment, thermally insulating material is encased between the layer forming a firewall and a layer forming a cover.

The structural element according to the disclosure herein advantageously comprises supports arranged between the protective assembly and the attachment pylon primary structure portion, so as to maintain a space between the protective assembly and the attachment pylon primary structure portion.

The space may be filled with a thermally insulating gas.

As a variant, the protective assembly extends directly onto the attachment pylon primary structure portion.

BRIEF DESCRIPTION OF THE DRAWINGS

The present disclosure will be better understood upon reading the description of purely indicative and in no way limiting exemplary embodiments, with reference to the appended drawings, in which:

FIG. 1 illustrates, schematically, a first embodiment of an aircraft structural element according to the disclosure herein;

FIGS. 2A to 2C illustrate, schematically, a second embodiment of an aircraft structural element according to the disclosure herein.

DETAILED DESCRIPTION

Figure 3A:
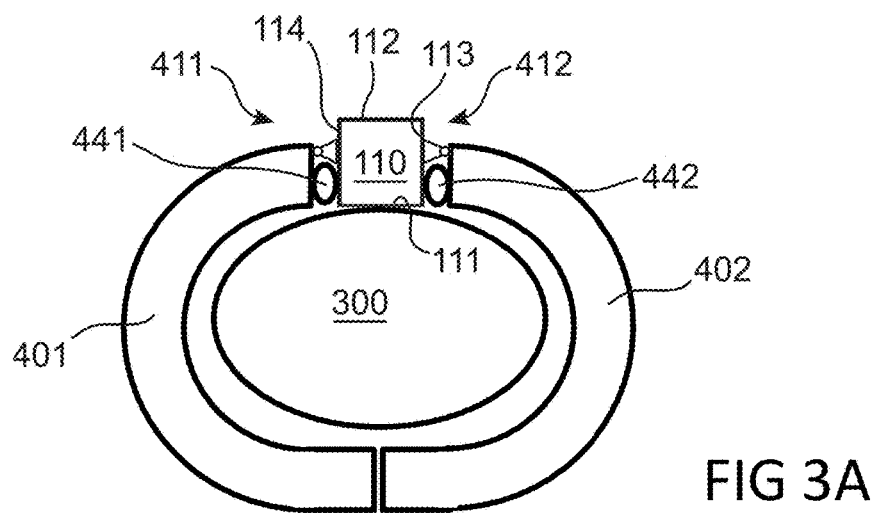
FIGS. 3A to 3C illustrate an exemplary application of the disclosure herein in a known aircraft architecture.

FIG. 1 illustrates, schematically and according to a view in section, a first embodiment of a structural element 100 according to the disclosure herein.

The structural element 100 comprises an attachment pylon primary structure portion 110. This attachment pylon primary structure portion 110 is covered by a thermally insulating layer 120, which is itself covered by a layer forming a firewall 130. Thermally insulating layer 120 and the layer forming a firewall 130 together form a protective assembly 140. Thermally insulating layer 120 and the layer forming a firewall 130 are superposed one on the other, preferably in direct contact with one another over their entire extent.

The protective assembly 140 generally does not participate in the transfer of forces from the engine to the rest of the aircraft, for example the wing. It simply protects the primary structure portion 110 from direct contact with the fire and from temperature gradients.

The protective assembly 140 forms a boundary between a zone 150 called the "fire zone" which is in direct contact with the fire in the event of fire in an engine 300, and a zone 160 called the "fire-adjacent zone" which is then protected from the fire. The fire zone 150 is located on that side of the protective assembly 140 where the aircraft engine 300 is located. The fire-adjacent zone 160 is located on that side of the protective assembly 140 which is remote from the engine 300. Thus, the protective assembly 140 places the primary structure portion 110 outside the fire zone 150.

The primary structure portion 110 is protected from the fire by the layer forming a firewall 130. It is also protected from the high temperatures by thermally insulating layer 120. It is even better protected from the high temperatures since thermally insulating layer 120 is protected from the fire by this same layer forming a firewall 130.

The layer forming a firewall 130 is a (standard) fireproof layer: it is flameproof and, where relevant, blocks the gases generated by the flames, for a desired duration, for example at least 15 minutes. In other words, the mechanical stability of the layer forming a firewall 130 is such that it remains fireproof for a desired duration, for example at least 15 minutes (ref. CS-25).

The layer forming a firewall 130 is for example made of metal, typically titanium, steel, or an alloy of titanium and steel. It is for example between 0.40 mm and 3 mm thick. A layer forming a firewall made of steel, and fireproof for 15 min, is at least 0.40 mm thick. A layer forming a firewall made of titanium, and fireproof for 15 min, is at least 0.45 mm thick.

As a variant, the layer forming a firewall is made of composite material. These are then fibres, such as carbon or metallic fibres, embedded in a matrix. The composite material is for example a ceramic matrix composite material, metallic matrix composite material, or an organic matrix composite material such as CFRP (Carbon Fibre Reinforced Polymer). A mineral matrix could even be used.

The thickness of the layer forming a firewall made of composite material is for example between 1 mm and 5 mm. It tends to degrade on contact with fire, which is why it is necessary to provide an increased thickness commensurate with an increased duration during which it is to act as a firewall.

Depending on the material used, and the desired duration during which it is to be fireproof, one skilled in the art will be able to adjust the thickness of the layer forming a firewall 130.

Thermally insulating layer 120, or thermal insulation blanket, comprises an insulating material 141. This insulating material 141 is encased within an envelope 142. The envelope 142 is advantageously made of a metal such as aluminium or (stainless) steel, but it is also possible to produce an envelope made of a composite material such as described above. The envelope 142 consists for example of a sheet which is between 0.2 and 0.3 mm thick. The insulating material is for example a material of the microporous or aerogel type. The thickness of insulating material is for example between 5 mm and 20 mm. The insulating material may help to maintain fireproofness, for example when the layer forming a firewall is damaged. The thickness of insulating material increases (rapidly) with a duration during which it is also to be fireproof.

In the example shown in FIG. 1, the envelope 142 and the layer forming a firewall 130 are two distinct layers attached one on the other, typically by means of an intumescent adhesive or an intumescent adhesive strip. An intumescent material expands when the temperature increases. This creates a second thermal barrier in the event of an engine fire. This second thermal barrier is located between the layer forming a firewall 130 and thermally insulating layer 120.

According to one variant, not shown, thermally insulating material 141 is encased between the layer forming a firewall 130, and a covering layer. The covering layer is attached to the layer forming a firewall for example by an intumescent adhesive. In other words, the covering layer and the layer forming a firewall 130 together form an envelope housing the insulating material.

The protective assembly 140 is attached to the primary structure portion 110 via supports 170, called fixed supports, preferably made of metal.

Each support 170 is connected on one hand to the protective assembly 140, and on the other hand to the primary structure 110. These connections comprise fasteners 180, preferably made of metal, which extend through the support 170 and the protective structure 140, respectively through the support 170 and the primary structure 110.

The support may be C-shaped, I-shaped, X-shaped or be of any other shape having a body and two projections which are mutually parallel and are separated by the body. The two projections make it possible for the fasteners to pass through them and to hold them with the assembly 140 or the structure 110. The body makes it possible to keep a separation between the assembly 140 and the structure 110.

Thermally insulating layer 120 is much thinner at the supports 170, so as to allow the installation of the attachment to the support 170.

For example, for each support 170, the thickness of insulating material 141 decreases progressively as one approaches the support 170, until it is zero when facing this support. The opposing walls 121, 125 of the envelope 142 (or, in the variant described above, the layer forming a firewall and the covering layer) are thus in direct contact with one another, at this support 170. The wall 121 of the envelope 142, facing the primary structure 110, remains substantially flat close to the support 170. The layer forming a firewall 130 then describes, at the support, a hat shape, with a flat top facing the support 170, for example an Ω shape or any other shape which is convex towards the primary structure 110.

The supports 170 keep a space 190 between the protective assembly 140 and the primary structure 110. The thickness e of this space is advantageously of the order of a centimeter. This space is for example an air space, which also helps create a thermal barrier between the primary structure 110 and the engine. It is also possible to fill this space with another type of gas, for example a gas having better thermal insulation properties.

In the example shown in FIG. 1, a corner 143 of the protective assembly 140 surrounds a corner 111 of the primary structure 110. The insulating material 141 extends everywhere in this corner 143.

It is possible to provide that the protective assembly 140 entirely surrounds the primary structure 110.

However, and in order to limit the bulkiness and the weight of the structural element according to the disclosure herein, the protective assembly 140 is advantageously arranged only on primary structure portions 110 which are at risk of being exposed to high temperatures, or which are at risk of being in direct contact with a fire. Fireproofing is thus advantageously established between the protective assembly and a primary structure portion which is not covered by the protective assembly, or between the protective assembly and another part of the aircraft.

FIG. 1 shows, for example, a fire-resistant seal 210, between the protective assembly 140 and a metallic foil 220. The seal 210 may be replaced by a metallic fishplate.

As a variant, a connection is made between the edges of the protective assembly and the edges of the primary structure portion covered by this same assembly. There is thus direct contact, at this connection, between the protective assembly 140 and the primary structure portion 110.

It is possible to provide openings in the protective assembly 140, in order to allow fasteners (for example nacelle cowling attachment fittings), and/or systems (for example electric supply cables, hydraulics, kerosene, etc.) to pass through. These openings are advantageously equipped with fire-resistant seals in order to maintain the fireproofness of the protective assembly 140.

The attachment pylon primary structure portion 110 is advantageously made of metal, for example titanium, steel, or an alloy of titanium and steel.

As a variant, the primary structure portion 110 is made of a composite material as described above, for example CFRP. The disclosure herein is then particularly advantageous in that it allows for the connection between the engine and the rest of the aircraft not to be affected by any sensitivity of the material of the primary structure to fire or high temperatures.

FIG. 2A illustrates, schematically and according to a view in section, a second embodiment of a structural element 100 according to the disclosure herein.

The embodiment shown in FIG. 2A differs from the embodiment shown in FIG. 1 in that the protective assembly 140 is directly in contact with the primary structure portion 110, over the entire extent of primary structure which it covers.

This embodiment allows space, and also weight, to be saved by omitting the supports 170.

The embodiment shown in FIG. 2A also differs from the embodiment shown in FIG. 1 in that the envelope 142 comprises the layer forming a firewall 130, the latter being formed by a simple increased thickness of the envelope, on the side further from the primary structure 110. This results in an effective combination of the firewall and thermal insulation functions, these two functions being provided by an assembly created in a single part from the design stage.

In the embodiment shown in FIG. 2A, a corner 143 of the protective assembly 140 surrounds a corner 111 of the primary structure 110. The protective assembly is created flat, then folded around the corner 111. So as to facilitate folding and to limit mechanical stresses on the envelope 142, the thickness of insulating material 141 reduces as one approaches an edge of the corner 143. When the protective assembly 140 is arranged flat, the face 121 of the envelope then has a cross section which is indented towards the layer forming a firewall 130, for example in the shape of a V whose two arms 122, 123 form between them an angle α (see FIG. 2B). The protective assembly 140 is then folded so as to form the corner 143 forming an angle $\beta=\pi-\alpha$ (see FIG. 2C). At this corner 143, two arms 122, 123 are then face to face. In FIG. 2A, and for illustration purposes, a space F between the surfaces 122, 123 when the corner 143 is formed has been exaggerated on purpose.

A description of a particularly advantageous exemplary application of the disclosure herein is set forth below, in an aircraft architecture.

FIG. 3A illustrates a first view in section of this architecture. FIG. 3A shows an engine 300 surrounded by a nacelle comprising two half-shells 401, 402. Each half-shell is articulated to a primary structure portion 110 by a respective pivot connection 411, 412 parallel to a longitudinal axis of the nacelle. On the primary structure portion 110, there is a lower longeron 111, on the engine side, an upper longeron 112 on the opposite side from the lower longeron, and two lateral panels 113, 114. The lateral faces of the primary structure portion 110 are formed from two lateral panels which are connected to one another by transverse stiffening ribs (not shown).

In the event of a fire in the engine 300, the lateral panels 113, 114 are protected from the fire by seals 441, 442, arranged all along the lateral panels and as close as possible to the engine 300. The seals 441, 442 prevent the flames from passing between a lateral panel and a nacelle half-shell, thus protecting the primary structure. These seals are for example made of silicone charged with fibres.

Figure 3B:
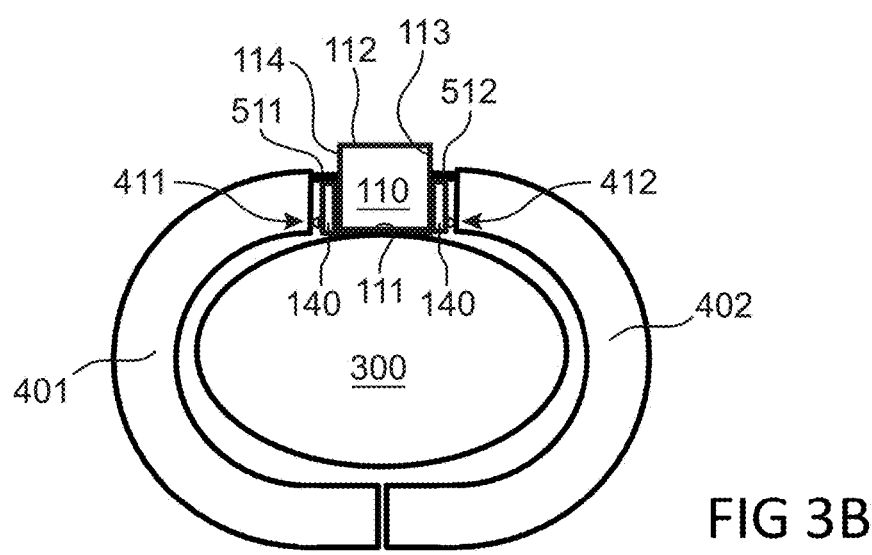

FIG. 3B illustrates a second view in section of the aircraft architecture shown in FIG. 3A. FIG. 3B differs from FIG. 3A in that the seals are replaced by metallic foils 511, 512 arranged all along the lateral panels, and above the pivot connections 411, 412. It is then these metallic foils which prevent flames from passing between a lateral panel and a nacelle half-shell, thus protecting the primary structure part located above the foils.

According to the prior art, the primary structure portion located beneath the metallic foils 511, 512 is therefore in direct contact with the flames in the event of an engine fire. This primary structure portion must therefore be made of a suitable and particularly fire-resistant material. The disclosure herein makes it possible to protect the primary structure portion located beneath the metallic foils 511, 512 by virtue of a protective assembly 140 according to the disclosure herein. A structural element 100 according to the disclosure herein is thus produced. It is then possible to relax the constraints on the material forming this primary structure portion.

Figure 3C:
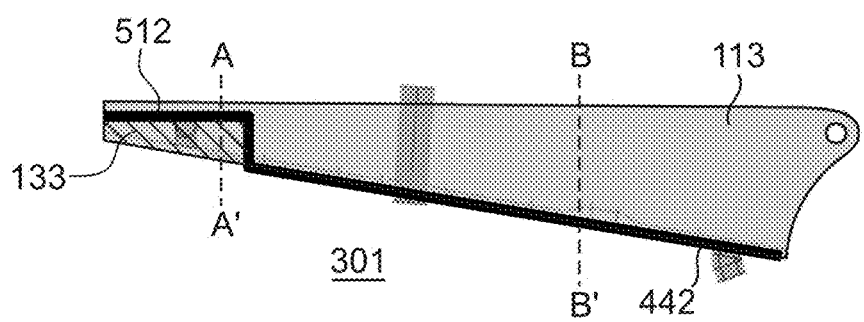

FIG. 3C illustrates, schematically and in a front view, the lateral panel 113 shown in FIGS. 3A and 3B. The seal 442 and the metallic foil 512 are shown in a thick line. The engine is in zone 301.

FIG. 3A corresponds to a section through axis BB'. The seal 442 extends all along the lower end of the lateral panel 113.

FIG. 3B corresponds to a section through axis AA'. The metallic foil 512 extends on the side of the upper end of the lateral panel 113. The primary structure 110 is covered by a protective assembly according to the disclosure herein, in a zone 133 of the lateral panel 113, located beneath the metallic foil 512, on the side of zone 301. Zone 133 is shown by the hatching in FIG. 3C.

For various practical reasons (connected for example to the passage of the hydraulic and/or electric systems), it may be advantageous for portions of the primary structure not to be protected from fire by a seal or a metallic foil.

Covering these portions with a protective assembly according to the disclosure herein ensures that they are nonetheless perfectly protected from fire and from high temperatures. It is thus possible to relax certain constraints relating to these primary structure portions (choice of materials, for example), without giving rise to new design constraints as might be the case if the seal 442 were to extend over the lower edge of the lateral panel 113 over the entire length of this panel.

It would also be possible to envisage using the protective assembly according to the disclosure herein to cover not a primary structure portion, but an electric, hydraulic or kerosene system.

While at least one exemplary embodiment of the present disclosure has been shown and described, it should be understood that modifications, substitutions and alternatives may be apparent to one of ordinary skill in the art and can be made without departing from the scope of the disclosure described herein. This application is intended to cover any adaptations or variations of the specific embodiments discussed herein. In addition, in this disclosure, the terms "comprise" or "comprising" do not exclude other elements or steps, and the terms "a" or "one" do not exclude a plural number. Furthermore, characteristics or steps which have been described with reference to one of the above exemplary embodiments may also be used in combination with other characteristics or steps of other exemplary embodiments described above.

The invention claimed is:

1. A structural element for an aircraft comprising at least one portion of an attachment pylon primary structure,
   wherein the attachment pylon primary structure portion is at least partially covered by a protective assembly comprising a layer forming a firewall and a thermally insulating layer,
   wherein the thermally insulating layer is located between the layer forming the firewall and the attachment pylon primary structure portion,
   wherein the protective assembly is connected to the attachment pylon primary structure portion via fasteners axially arranged in pairs, wherein one of each pair of the fasteners extends through the protective assembly and the other of each pair of the fasteners extends through the pylon primary structure.

2. The structural element according to claim 1, wherein the attachment pylon primary structure portion is made of composite material.

3. The structural element according to claim 1, wherein the layer forming the firewall is metallic.

4. The structural element according to claim 1, wherein the layer forming the firewall is made of composite material.

5. The structural element according to claim 1, wherein the thickness of the layer forming the firewall is determined as a function of a desired fire resistance duration of the protective assembly.

6. The structural element according to claim 1, wherein the thickness of the thermally insulating layer is determined as a function of a desired fire resistance duration of the protective assembly.

7. The structural element according to claim 1, wherein the thermally insulating layer comprises a thermally insulating material.

8. The structural element according to claim 7, wherein the thermally insulating material is encased within an envelope.

9. The structural element according to claim 8, wherein the layer forming the firewall and the envelope are attached to one another by an intumescent adhesive or an intermediate intumescent adhesive layer.

10. The structural element according to claim 7, wherein the thermally insulating material is encased between the layer forming the firewall and a layer forming a cover.

11. The structural element according to claim 1, wherein the fasteners connect the attachment pylon primary structure to the protective assembly through supports arranged so as to maintain a space between the protective assembly and the attachment pylon primary structure portion, wherein each support has a body and two mutually parallel projections.

12. The structural element according to claim 11, wherein the space is filled with a thermally insulating gas.

* * * * *